Dec. 23, 1958  G. R. BAYLEY  2,865,220
CONTROL MECHANISM
Filed Nov. 12, 1953  2 Sheets-Sheet 1

INVENTOR
George R. Bayley
BY
C. H. Sikes
ATTORNEY

Dec. 23, 1958  G. R. BAYLEY  2,865,220
CONTROL MECHANISM
Filed Nov. 12, 1953  2 Sheets-Sheet 2

INVENTOR
George R. Bayley
BY
C. H. Ditte
ATTORNEY

2,865,220

CONTROL MECHANISM

George R. Bayley, Flint, Mich., assignor to General Motors Corporation, Detroit, Mich., a corporation of Delaware Application November 12, 1953, Serial No. 391,425

10 Claims. (Cl. 74—471)

This invention relates to double acting levers. More particularly, the invention is directed to motion translating mechanism associated with such levers.

An object of the invention is to provide a single control lever operable upon swinging movement thereof to selectively actuate either of a pair of remotely disposed mechanisms.

Another object is to provide a control mechanism of the type described wherein the manual control lever travels in a circular path.

A further object is to provide a lever mechanism for actuating a pair of cable controls disposed in side by side generally parallel relation, wherein movement of the control lever in either direction from neutral is effective to actuate alternately one or the other of said control cables.

Still another object is to provide a device of the stated character which is simple in construction, low in cost and efficient in operation.

These and other objects and advantages of the invention will become more fully apparent as reference is had to the accompanying description and drawings wherein.

Figure 1:
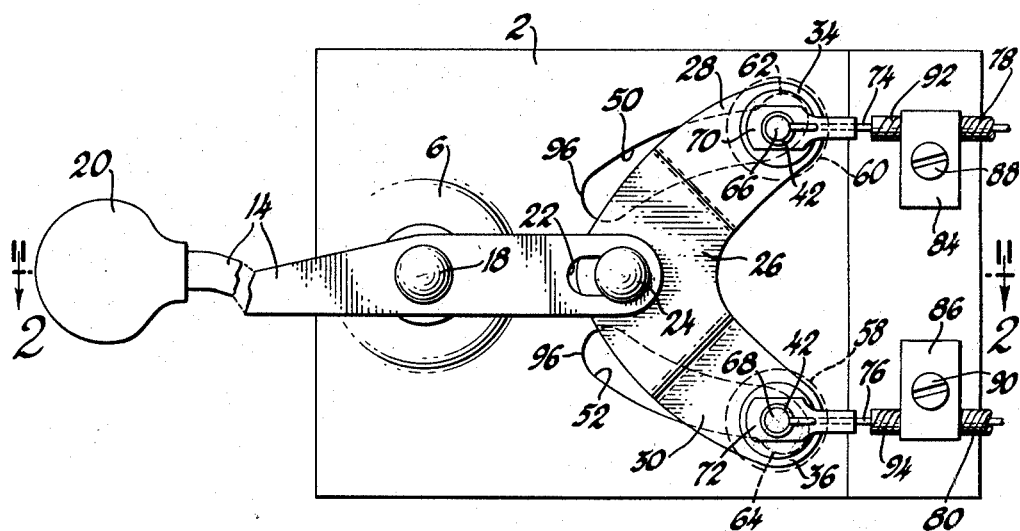
Fig. 1 is a plan view illustrating the form and arrangement of the parts when the mechanism is in neutral position.
Figure 2:
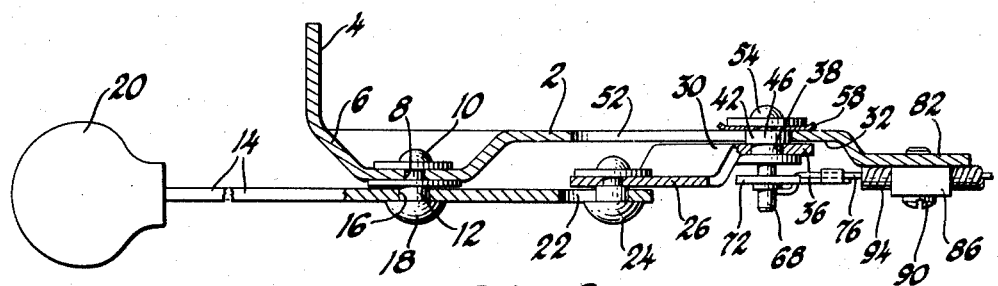
Fig. 2 is a side elevational view partly in section taken substantially along the lines 2—2 of Fig. 1.

Referring now to the drawings and particularly Figs. 1 and 2, there is illustrated a double action control lever mechanism adapted primarily for interconnection with suitable mechanisms by means of conventional Bowden cables. While the mechanism illustrated is intended primarily for use in controlling from a remote location, the ventilator and heater temperature control of an automotive ventilating system, it may be used in conjunction with any installation requiring a common control for selectively actuating one of a plurality of mechanisms without effecting the other.

The control lever mechanism consists generally of a relatively flat sheet metal support 2 having an upturned front marginal edge 4 which is adapted for attachment, in either a vertical or horizontal plane, to any suitable mounting surface, such as the instrument panel of an automotive vehicle. Transversely midway of support 2 and slightly inwardly of edge 4 is a circular depressed portion 6 having an aperture 8 formed therein. Riveted in aperture 8 is a stud 10 having an enlarged depending shaft portion 12 integral therewith. Disposed below plate 2 in generally parallel relation thereto is a relatively long lever 14 having an aperture 16 formed intermediately thereof and adapted to receive the shaft portion 12 of stud 10. Lever 14 is freely swingable about shaft 12 but restrained against axial movement thereon by the head 18 formed by peening over the lower end thereof. Lever 14 extends forwardly from stud 10 beyond the turned edge 4 of plate 2 and is provided at its outer extremity with a suitable hand grip portion or knob 20. At its inner end, lever 14 is formed with a longitudinally elongated slot 22 which in turn pivotally and slidably engages a depending stud 24 rigidly secured centrally in a generally V-shaped link 26. At its opposite ends, link 26 is formed with upwardly offset portions 28 and 30 which lie in planes adjacent the lower surface 32 of plate 2. At their outer extremities 34 and 36, offset portions 28 and 30 are provided with apertures 38 having vertically directed studs 42 rigidly secured therein at their axial midportions. The upper ends 46 of studs 42 extend upwardly through forwardly converging slots 50 and 52 formed in plate 2. Rivet heads 54 formed on ends 46 compress spring washers 58 and 60 to provide frictional engagement between link 26 and plate 2. Each slot 50 and 52 is arcuate in form and is generated from a point located at the forward terminal extremity of the opposing slot. At their rearward diverging ends, slots 50 and 52 are provided with laterally directed curved notches 62 and 64, the purpose of which will be described later herein. The lower shaft like ends 66 and 68 of studs 42 extend downwardly from offset portions 28 and 30 and are adapted to receive coupling members 70 and 72 which, in turn, are connected to the cable or wire elements 74 and 76 of Bowden cables 78 and 80. Cables 74 and 76 are secured in generally parallel laterally spaced apart relation on the lower surface of downwardly offset portion 82 of plate 2 by clamping members 84 and 86 which are threadably attached in alignment with the diverging rearward ends of slots 50 and 52. Upon tightening of threaded members 88 and 90, clamps 84 and 86 frictionally grip the sheath portions 92 and 94 of cables 78 and 80 to retain the same in predetermined alignment and relationship with the mechanism.

Figure 3:
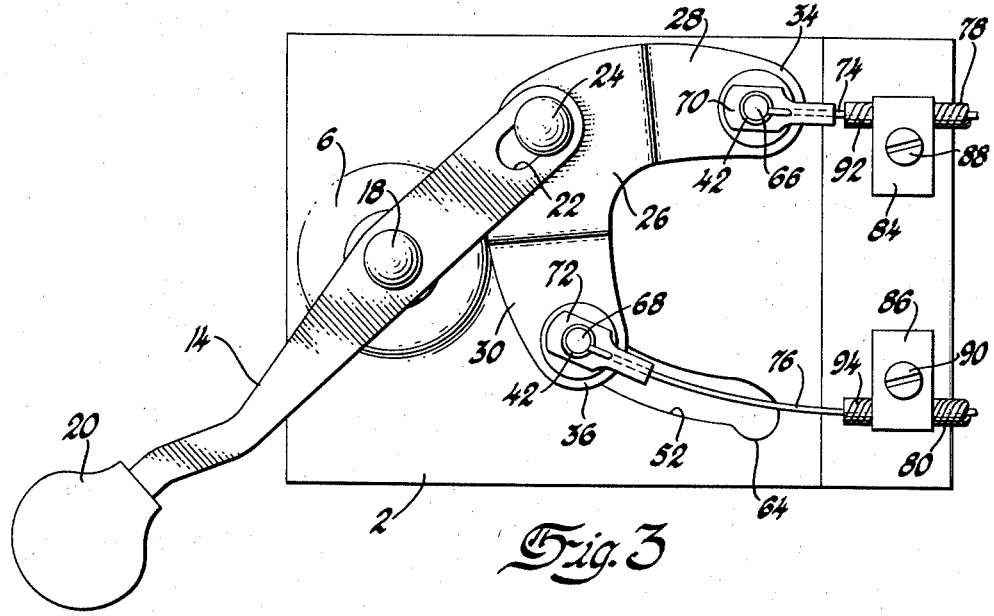
Fig. 3 is a view similar to Fig. 1 illustrating the position of the parts when the mechanism is in the full right operating position.
Figure 4:
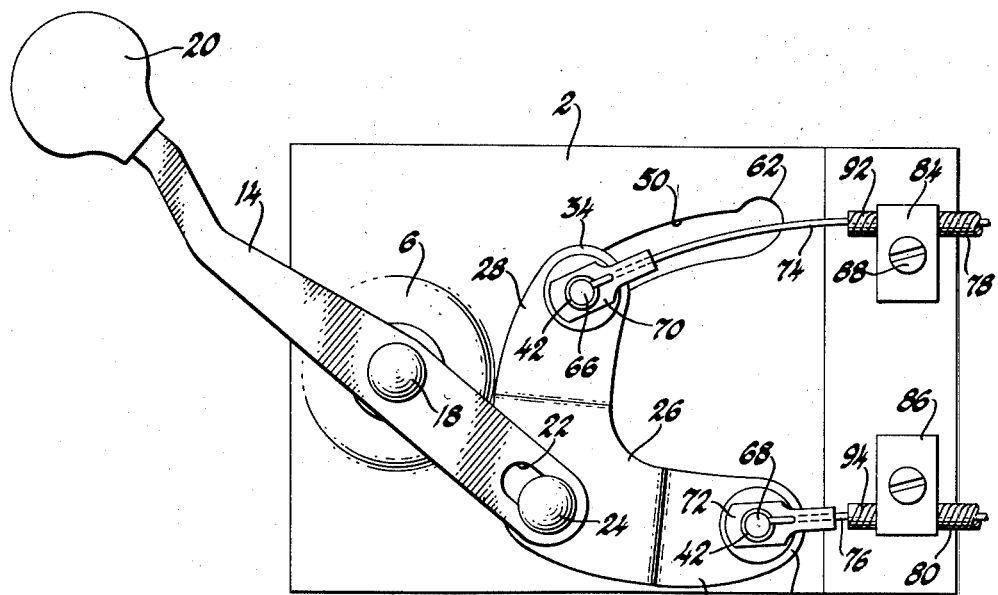
Fig. 4 is a view similar to Fig. 3 illustrating the position of the parts when the mechanism is in the full left operating position.

As seen best in Fig. 1, when lever 14 is longitudinally aligned in the neutral or centered position, the outer extremities 34 and 36 of V-shaped link 26 are maintained in transverse alignment whereby the studs 42 and 44 occupy the rearward extremities of slots 50 and 52 and are equidistant from the respective Bowden cable clamps 84 and 86. Upon counterclockwise movement of the hand grip portion of lever 14 from the neutral position to the position illustrated in Fig. 3, the inner end of lever 14 swings clockwise to impart swinging movement to V-shaped link 26 by virtue of the pivotal connection with stud 24. Initially however, link 26 moves slightly transversely to seat stud 42 firmly in notch 62 of slot 50. Thereafter continued swinging movement of lever 14 causes the entire link 26 to pivot clockwise about stud 42. Since the forwardly converging opposing slots 50 and 52 define arcs generated from the opposing notched terminal portions 62 and 64, stud 44 at the opposite end of link 26 moves forwardly along the path defined by slot 52 toward its inner terminal end 96. As the link 26 pivots about the stud 42, it will be apparent that control wire 74 will remain stationary while control wire 76 carried by stud 44 will move axially forwardly in the sheath or guide 94 thereby actuating any mechanism, not shown, connected at the opposite end of wire 76. Upon return swinging movement of lever 14 to the neutral position, the various parts travel reversely through the paths previously described. Therefore, the link 26 pivots counterclockwise about the stud 42, causing the opposite end of link 26 to swing rearwardly along arcuate track 52 to its rearward terminal end to return the control cable 76 to its normal position relative to the sheath member 94. Clockwise movement of lever 14 from the neutral position will, of course, cause a duplication of the operation described, except that the link 26 pivots about the stud 44. Consequently, control wire 76 remains stationary while control wire 74 travels fore and aft in sheath 92.

It will be noted that during operation of the control mechanism in either direction from neutral, the inner end of lever 14 describes an arcuate path which is at all times dissimilar to the irregular path described by stud 24 of link 26. However, by providing elongated slot 22 in lever 14, constant driving engagement between link 26 and lever 14 is maintained while compensating for the dissimilar paths of movement of the respective members.

From the foregoing it will be seen that operation of lever 14 in one direction to and from the neutral central position actuates the control cable for one mechanism without in any way effecting the position of adjustment of the other mechanism; while movement of lever 14 in the opposite direction to and from the neutral position actuates the control cable for the other mechanism to the exclusion of the first mentioned mechanism. It is particularly important to note that by virtue of the described construction, the lever 14 is permitted to travel through a circular path rather than the necessarily irregular path of movement of V-shaped link 26. By providing a lever movable in a circular path, the control mechanism is particularly suitable for installation on instrument panels or other mounting surfaces having a circular cross section, since the control knob will maintain a constant track with reference to the surface of the panel, throughout its entire range of movement.

While but one embodiment of the invention has been shown and described, it will be apparent that other changes and modifications may be made therein. It is, therefore, to be understood that it is not intended to limit the invention to the embodiment shown but only by the scope of the claims which follow.

I claim:

1. A double action lever mechanism comprising a support, a lever mounted for pivotal movement on a fixed axis on said support, a pair of control cables, guide means for said cables secured on said support in parallel spaced apart relation, means forming converging arcuate guide slots in said support at one side of said axis and symmetrical relative thereto, said guide slots having laterally extended portions at the diverging ends thereof, each of said arcuate guide slots being concentric with the laterally extended portion of the opposing slot, a link extending between the diverging ends of said slots, means pivotally and slidably connecting the opposite ends of said link with the respective guide slots, additional means connecting each of said control cables with the opposite ends of said link, and means on said link slidably and pivotally engaging said lever, said last mentioned means being spaced from the lateral centerline of the ends of said link whereby swinging movement of said lever in one direction causes said link to pivot about one end thereof and swinging movement of said lever in the opposite direction causes said link to pivot about the other end thereof.

2. A lever structure comprising a support, a lever mounted for pivotal movement on said support, means forming spaced apart converging guide slots in said support, a link having means slidably and pivotally engaging said lever and said guide slots, said last mentioned means being arranged in a generally triangular relation whereby said link is pivotally responsive to said lever about either of its slidable and pivotal connections with said guide slots.

3. A dual control assembly, comprising a flat base, having a pair of oppositely disposed converging arcuate slots, each slot having an outer lateral offset pivot portion at its divergent end, and each being concentric about the offset pivot portion of the other, a raised bearing boss, spaced equally from and beyond the convergent ends of said slots, a pivot on said boss, an L-shaped member, having means at one end slideably engaged in one of said slots, and means at the other end slideably engaged in the other of said slots, and having its central portion offset from said ends, and lying in the plane of the top of said boss, and having a pivot pin centrally disposed thereof, said means being spaced apart a distance equal to the distance between one of said offset pivot portions of one slot and the other arcuate slot, a lever pivoted between its ends on said pivot on said boss, and having one end slotted and fitted slideably and rotatably over the pivot pin on said L-shaped member, and cable engaging means on the ends of said L-shaped member.

4. A dual control assembly, comprising a flat base, having a pair of oppositely disposed converging arcuate slots, each slot having an outer lateral offset pivot portion at its divergent end, and each being concentric about the offset pivot portion of the other, a raised bearing boss, spaced equally from and beyond the convergent ends of said slots, a pivot on said boss, a lever member, having means at one end slideably engaged in one of said slots, and means at the other end slideably engaged in the other of said slots, and having its central portion offset from said ends, and lying in the plane of the top of said boss, and having a pivot pin centrally disposed thereof, said means being spaced apart a distance equal to the distance between one of said offset pivot portions of one slot and the other arcuate slot, a lever pivoted between its ends on said pivot on said boss, and having one end slotted and fitted slideably and rotatably over the pivot pin on said lever member, and cable engaging means on the ends of said lever member.

5. A dual control assembly, comprising a flat base, having a pair of oppositely disposed converging arcuate slots, each slot having an outer lateral offset pivot portion at its divergent end, and each being concentric about the offset pivot portion of the other, a raised bearing boss, spaced equally from and beyond the convergent ends of said slots, a pivot on said boss, an L-shaped member, having means at one end slideably engaged in one of said slots, and means at the other end slideably engaged in the other of said slots, and having its central portion offset from said ends, and lying in the plane of the top of said boss, and having a pivot pin centrally disposed thereof, a lever pivoted between its ends on said pivot on said boss, and having one end slotted and fitted slideably and rotatably over the pivot pin on said L-shaped member, and cable engaging means on the ends of said L-shaped member.

6. A dual control assembly, comprising a flat base, having a pair of oppositely disposed converging arcuate slots, each slot having an outer lateral offset pivot portion at its divergent end, and each being concentric about the offset pivot portion of the other, a raised bearing boss, spaced equally from and beyond the convergent ends of said slots, a pivot on said boss, an L-shaped member, having means at one end slideably engaged in one of said slots, and means at the other end slideably engaged in the other of said slots, and having its central portion offset from said ends, and lying in the plane of the top of said boss, and having a pivot pin centrally disposed thereof, a lever pivoted between its ends on said pivot on said boss, and having one end slotted and fitted slideably and rotatably over the pivot pin on said L-shaped member, and cable engaging means on the ends of said L-shaped member.

7. A dual control assembly, comprising a flat base, having a pair of oppositely disposed converging arcuate slots, each slot having an outer lateral offset pivot portion at its divergent end, and each being concentric about the offset pivot portion of the other, a raised bearing boss, spaced equally from and beyond the convergent ends of said slots, a pivot on said boss, an L-shaped member, having means at one end slideably engaged in one of said slots, and means at the other end slideably engaged in the other of said slots, and having its central portion offset from said ends, and lying in the plane of the top of said boss, and having a pivot pin centrally disposed thereof, said means being spaced apart a distance equal to the distance between one of said offset pivot portions of one slot and the other arcuate slot, a lever pivoted between its ends on said pivot on said boss, and having one end slotted and fitted slideably and rotatably over the pivot pin on said L-shaped member.

8. A dual control assembly, comprising a flat base, having a pair of oppositely disposed converging arcuate slots, each slot having an outer lateral offset pivot portion at its divergent end, and each being concentric about the offset pivot portion of the other, a pivot spaced equally from and beyond the convergent ends of said slots, an L-shaped member, having means at one end slidably engaged in one of said slots, and means at the other end slideably engaged in the other of said slots, and having a pivot pin centrally disposed thereof, said means being spaced apart a distance equal to the distance between one of said offset pivot portions of one slot and the other arcuate slot, a lever pivoted between its ends on said pivot, and having one end slotted and fitted slideably and rotatably over the pivot pin on said L-shaped member, and cable engaging means on the ends of said L-shaped member.

9. A dual control assembly, comprising a flat base, having a pair of oppositely disposed converging arcuate slots, each slot having an outer lateral offset pivot portion at its divergent end, and each being concentric about the offset pivot portion of the other, a pivot spaced equally from and beyond the convergent ends of said slots, a lever member, having means at one end slideably engaged in one of said slots, and means at the other end slideably engaged in the other of said slots, and having a pivot pin centrally disposed thereof, said means being spaced apart a distance equal to the distance between one of said offset pivot portions of one slot and the other arcuate slot, a lever pivoted between its ends on said pivot, and having one end slotted and fitted slideably and rotatably over the pivot pin on said lever member, and cable engaging means on the ends of said lever member.

10. A dual control assembly, comprising a flate base, having a pair of oppositely disposed converging arcuate slots, each slot having an outer lateral offset pivot portion at its divergent end, and each being concentric about the offset pivot portion of the other, a pivot spaced equally from and beyond the convergent ends of said slots, an L-shaped member, having means at one end slideably engaged in one of said slots, and means at the other end slideably engaged in the other of said slots, and having a pivot pin centrally disposed thereof, a lever pivoted between its ends on said pivot, and having one end slotted and fitted slideably and rotatably over the pivot pin on said L-shaped member.

References Cited in the file of this patent

UNITED STATES PATENTS

| | | |
|---|---|---|
| 987,310 | McClaren | Mar. 21, 1911 |
| 2,460,693 | Hall | Feb. 1, 1949 |
| 2,483,224 | Narcovich | Sept. 27, 1949 |
| 2,539,217 | Willoughby | Jan. 23, 1951 |
| 2,571,028 | Gerry | Oct. 9, 1951 |
| 2,634,670 | Simons | Apr. 14, 1953 |

FOREIGN PATENTS

| | | |
|---|---|---|
| 168,241 | Great Britain | Sept. 1, 1921 |
| 716,697 | Germany | Jan. 27, 1942 |